(12) United States Patent
Jin et al.

(10) Patent No.: US 9,075,797 B2
(45) Date of Patent: *Jul. 7, 2015

(54) RESTORE PCIE TRANSACTION ID ON THE FLY

(71) Applicant: Emulex Corporation, Costa Mesa, CA (US)

(72) Inventors: Daming Jin, Costa Mesa, CA (US); Vuong Cao Nguyen, Costa Mesa, CA (US); Sam Shan-Jan Su, Costa Mesa, CA (US); John Sui-Kei Tang, Costa Mesa, CA (US); Peter Mark Fiacco, Costa Mesa, CA (US)

(73) Assignee: EMULEX CORPORATION, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,637

(22) Filed: Dec. 2, 2013

(65) Prior Publication Data

US 2014/0095741 A1    Apr. 3, 2014

Related U.S. Application Data

(63) Continuation of application No. 12/134,985, filed on Jun. 6, 2008, now Pat. No. 8,631,169.

(51) Int. Cl.
G06F 13/28    (2006.01)

(52) U.S. Cl.
CPC ................................ *G06F 13/28* (2013.01)

(58) Field of Classification Search
USPC ............................................................ 710/22
See application file for complete search history.

(56) References Cited

U.S. PATENT DOCUMENTS

| 5,768,548 | A  | 6/1998  | Young et al. |
| 6,810,452 | B1 | 10/2004 | James et al. |
| 7,836,328 | B1 | 11/2010 | Puri et al.  |

*Primary Examiner* — Chun-Kuan Lee
(74) *Attorney, Agent, or Firm* — McAndrews, Held & Malloy Ltd.

(57) ABSTRACT

Restoring retired transaction identifiers (TID) associated with Direct Memory Access (DMA) commands without waiting for all DMA traffic to terminate is disclosed. A scoreboard is used to track retired TIDs and selectively restore retired TIDs on the fly. DMA engines fetch a TID, and use it to tag every DMA request. If the request is completed, the TID can be recycled to be used to tag a subsequent request. However, if a request is not completed, the TID is retired. Retired TIDs can be restored without having to wait for DMA traffic to end. Any retired TID value may be mapped to a bit location inside a scoreboard. All processors in the system may have access to read and clear the scoreboard. Clearing the TID scoreboard may trigger a DMA engine to restore the TID mapped to that location, and the TID may be used again.

20 Claims, 4 Drawing Sheets

Firmware Commands

| Instruction | FW Instruction 1 | FW Instruction 2 | FW Instruction 3 |
|---|---|---|---|
| Size (Bytes) | 1024 | 2048 | 1024 |
| DMA Requests | 2x512 | 4x512 | 2x512 |
| # Reads Sent | 2 | 4 | 2 |
| Assigned TID | 0,1 | 2,3,4,5 | 6,7 |

Retired TID Scoreboard

| TID | 0 | 1 | 2 | 3 | 4 | 5 | 6 | 7 | ... | N-1 | N |
|---|---|---|---|---|---|---|---|---|---|---|---|
| Status | 0 | 0 | 0 | 0 | 1 | 1 | 0 | 0 | ... | 0 | 0 |

RESTORE PCIE TRANSACTION ID ON THE FLY

RELATED APPLICATIONS

This patent application is a continuation of U.S. patent application Ser. No. 12/134,985 filed on Jun. 6, 2008. The above-referenced United States patent application is incorporated by reference herein in its entirety.

FIELD OF THE INVENTION

Embodiments of the invention relates generally to tracking retired transaction identifiers (TIDs), and more specifically to selectively restoring retired TIDs on the fly.

BACKGROUND OF THE INVENTION

Direct Memory Access (DMA) is commonly used in modern computing systems to permit hardware subsystems to access system memory independently of a central processing unit (CPU). Hardware subsystems utilizing DMA may include disk drive controllers, graphics cards, network cards, sound cards, and the like. Utilizing DMA permits a system to transfer data to and from these devices with much less CPU overhead. By using DMA to directly access these hardware subsystems, the CPU is removed from the copy and transfer of data from the host to target devices.

In a conventional computing system, a CPU may initiate a transfer with a command given by firmware to a DMA engine, though the CPU does not execute the command. The firmware command may include the host address to access and a byte count. The DMA engine then requests the information or executes the command to the host device. The DMA engine may also assign a transaction identification (TID) to each interaction with the host device. The TID is assigned to track the requests from the DMA engine. Once an operation is complete, the TID is returned to a pool of available TIDs. If an operation is not completed, for example, when the operation times out because of a non-responsive device, the associated TID is retired. Because the TID is retired, the operation will no longer be associated with that command. If there are later returns of that command, it will not cause any mismatch. As more TIDs are retired, there are fewer permissible transactions occurring at a given time. Therefore, the TIDs should be reset periodically when the available TIDs affect system performance. However, conventionally, all DMA requests must be completed before resetting the TIDs. Therefore, the system operations must be suspended in order to reset the TIDs, which costs system time and performance.

In conventional DMA engines, the process of restoring retired TIDs requires all DMA activities to quiet or complete, for all channels. Firmware can ensure that all outstanding DMA requests are completed. The restore action generally acts like a TID first in, first out (FIFO) reset. Any outstanding DMA requests with a particular TID would be skewed during the TID FIFO reset. There may be a performance cost associated with the reset, and the DMA engines for the various channels that do not retire any TIDs may be affected. In addition, firmware complexity may be increased due to the coordination between multiple processors. Finally, during a restore TID operation, firmware cannot issue any more DMA commands, and the wait for outstanding DMA commands to complete may be unpredictable, depending on the host latency and other traffic on the system.

SUMMARY OF THE INVENTION

Embodiments of the invention relate to restoring retired transaction identifiers (TID) associated with Direct Memory Access (DMA) commands without waiting for all DMA traffic to terminate. More specifically, embodiments of the invention relate to using a scoreboard to track retired TIDs and selectively restoring retired TIDs on the fly. DMA engines fetch a TID, and use it to tag every DMA request. If the request is completed, the TID can be recycled to be used to tag a subsequent request. However, if a request is not completed, the TID is retired. If a sufficient number of TIDs are retired, the performance of the DMA may be impacted. Embodiments of the current invention permit TIDs to be restored without having to wait for DMA traffic to end. Any retired TID value may be mapped to a bit location inside a scoreboard. All processors in the system may have access to read and clear the scoreboard. Clearing the TID scoreboard may trigger a DMA engine to restore the TID mapped to that location, and the TID may be used again.

A representative retired TID scoreboard may be a register representing a bit map. The scoreboard keeps track of all possible TIDs, and the status of the TID. The status bit indicates whether each TID is active or retired. If all the requests are returned and completed, the scoreboard may assign a status bit of "0" to each returned TID. However, if a request associated with a particular TID timed out, that TID would be retired. The DMA engine may set the status bit of those TIDs to "1" in the scoreboard, indicating that those TIDs have been retired.

Firmware executed by a processor may be used to monitor the TID scoreboard to determine when a TID should be restored. Individual TIDs may be restored without resetting the entire DMA engine. The restoration of individual TIDs may also occur without having to wait for other DMA traffic to complete. Processors may coordinate the TID restore to ensure that a particular TID is not in use when it is cleared.

In one embodiment, the DMA engine may periodically monitor the retired TID scoreboard to determine when a "clear" should occur. For instance, the DMA engine can poll the scoreboard periodically, at a rate set by the longest time out period of an attached host device. Alternatively, the poll rate may be programmed into a register and changed by software or a user. The poll rate may also depend on the number of remaining available TIDs. For instance, when all TIDs are available, and no TIDs have yet been retired, the DMA engine may poll the scoreboard after a set amount of time. After this poll, if the scoreboard indicates that only a few TIDs were retired, the DMA engine may decrease the poll rate. However, if the number of retired TIDs is found to be large, the DMA engine may increase the poll rate. Any one of these methods, or a combination of methods, may be used to determine a polling rate of the scoreboard by the DMA engine.

After polling the TID scoreboard, the DMA engine may determine that some or all of the TIDs should be restored. Once the DMA engine determines that a restore is needed, the DMA engine may send an interrupt signal to a process running in the DMA engine to determine which retired TID should be restored. The DMA engine may determine that a restore should occur based on a variety of factors. For instance, the DMA may track the remaining available TIDs, and if the remaining available TIDs falls below a determined threshold, the DMA engine may send an interrupt signal to the process running in the DMA processor. Alternatively, the DMA engine may compare the remaining available TIDs to the number of retired TIDs, and send an interrupt if the percentage of available TIDs falls below a certain threshold. The DMA engine may also keep track of previous copies of the TID scoreboard to determine the rate at which TIDs are retired. For instance, if a host device is non-responsive, then all DMA requests associated with that host will time out and the associated TIDs will be retired. The single unresponsive host may retire multiple TIDs in a short period of time. Therefore, the DMA engine may compare previous copies of the scoreboard to the present scoreboard to determine how many new TIDs were retired since the last poll. If the number of newly retired TIDs is above a certain threshold, then the DMA may send an interrupt signal. The DMA may use any one of these methods, or a combination thereof, or other factors to determine whether an interrupt should be generated.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention relate to restoring retired transaction identifiers (TID) associated with Direct Memory Access (DMA) commands without waiting for all DMA traffic to terminate. More specifically, embodiments of the invention relate to using a scoreboard to track retired TIDs and selectively restoring retired TIDs on the fly. DMA engines fetch a TID, and use it to tag every DMA request. If the request is completed, the TID can be recycled to be used to tag a subsequent request. However, if a request is not completed, the TID is retired. If a sufficient number of TIDs are retired, the performance of the DMA may be impacted. Conventionally, all DMA requests must be completed before resetting the TIDs, which can also impact performance. Therefore, embodiments of the current invention permit TIDs to be restored without having to wait for DMA traffic to end. Any retired TID value may be mapped to a bit location inside a scoreboard. All processors in the system may have access to read and clear the scoreboard. Clearing the TID scoreboard may trigger a DMA engine to restore the TID mapped to that location, and the TID may be used again.

Although embodiments of the invention may be described and illustrated herein in terms of transaction identifiers associated with DMA commands, it should be understood that embodiments of this invention are not so limited, but are additionally applicable to command engines in general that use identifiers to tag and track commands, where the identifier is retired and no longer available if the command is not completed.

Figure 1:
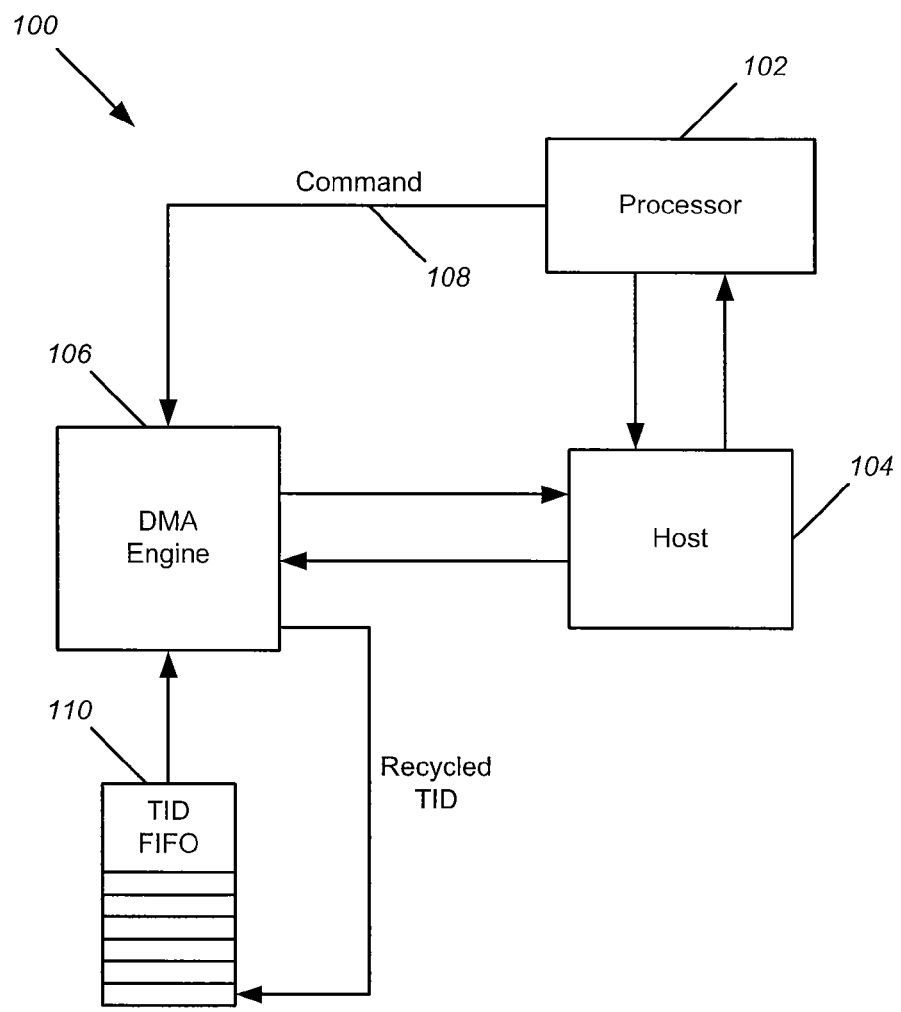
FIG. 1 illustrates an exemplary computing system using transaction identifiers (TIDs) to track Direct Memory Access (DMA) commands according to embodiments of the invention.

FIG. 1 illustrates an exemplary computing system 100 according to embodiments of the invention using transaction identifiers (TIDs) to track Direct Memory Access (DMA) commands. Computing system 100 includes a processor 102 that interacts with a host 104. The host 104 may be a hardware subsystem that transfers data and interacts with other devices such as a DMA engine 106, drive controllers, graphics cards, network cards, and the like. The DMA engine 106 can transfer data between the host 104 and these devices, bypassing the processor 102. Using the DMA engine 106 reduces processor 102 overhead and may increase overall performance.

The DMA engine 106 may receive a firmware command 108 from processor 102 to transfer data between host 104 and other devices. The DMA engine 106 can fetch a TID from a pool of available TIDs. The pool may be a queue of available TIDs, such as, for example, a first in first out (FIFO) queue 110. The DMA engine 106 uses a TID to tag every request. During normal operation, after all of the data to or from the host 104 is transferred for a given request, the DMA engine 106 recycles the TID back into the TID FIFO 110. However, if a DMA request is not completed, for example, if a host reaches a timeout, or any abort operation is received for the given request, the TID is retired. The retired TIDs are not used again and the available pool of TIDs is reduced by one.

Figure 2A:
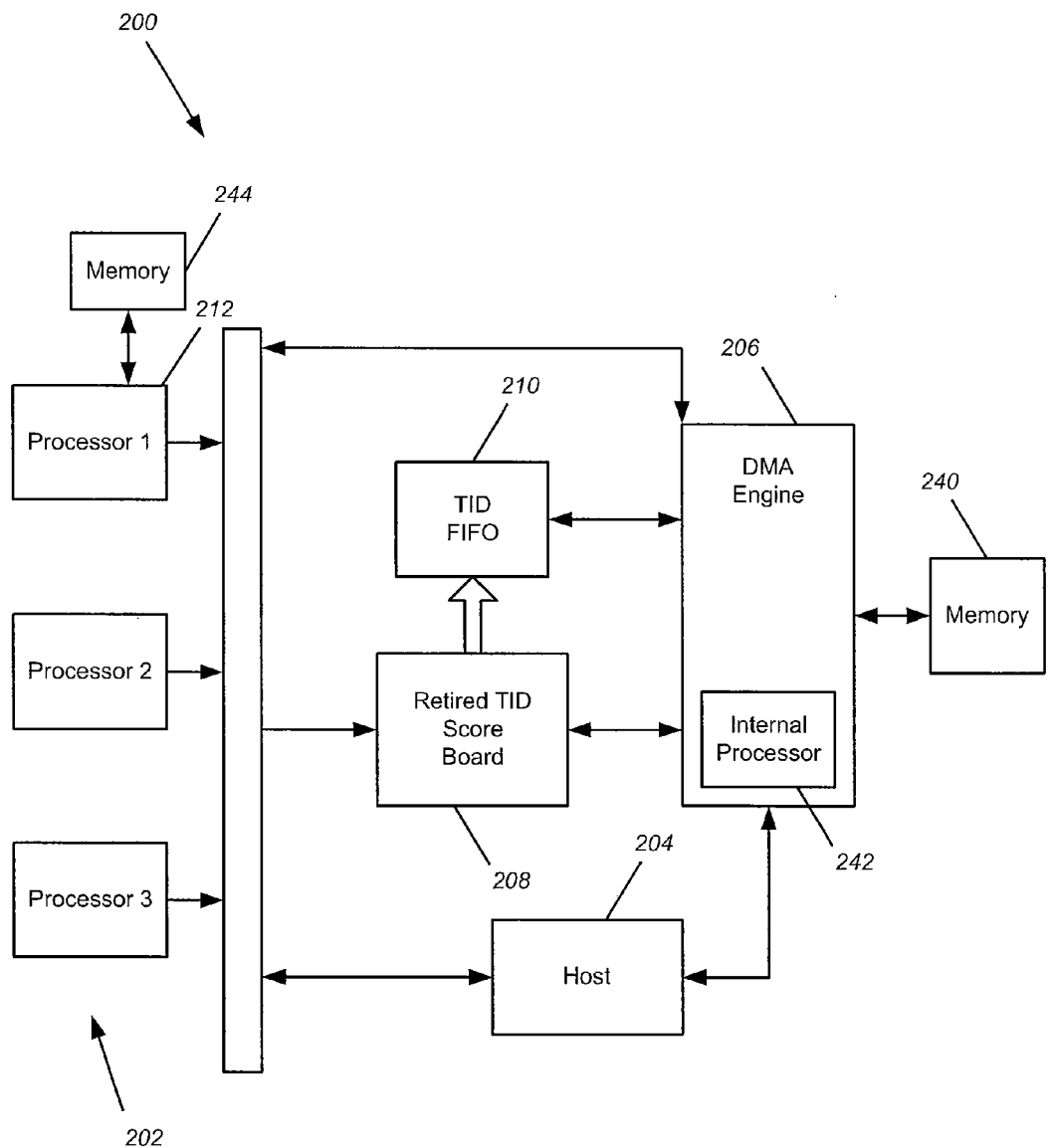
FIG. 2A illustrates a representative computing system including multiple processors and a DMA engine which may interact with a host and utilize a retired TID scoreboard according to embodiments of the invention.

FIG. 2A illustrates a representative computing system 200 with multiple processors 202 and DMA engine 206, each of which may interact with a host 204 and a retired TID scoreboard 208 according to aspects of the invention. The DMA engine 206 assigns a TID, obtained from the TID FIFO 210, to any DMA request sent to the host 204. Once the DMA request is completed, the TID is returned to the TID FIFO 210. If the DMA request is not completed, the TID is retired. The scoreboard 208 is visible to all processors 202. Any retired TID value may be mapped to a bit location inside the scoreboard 208. All of the processors 202 may have read and clear access to the scoreboard 208. The clear action of the retired TID scoreboard 208 may trigger the DMA engine 206 to restore the TID mapped to that location. After the restore operation, the TID may be used again and the total available TID pool will be increased by one.

Figures 2B, 2C:
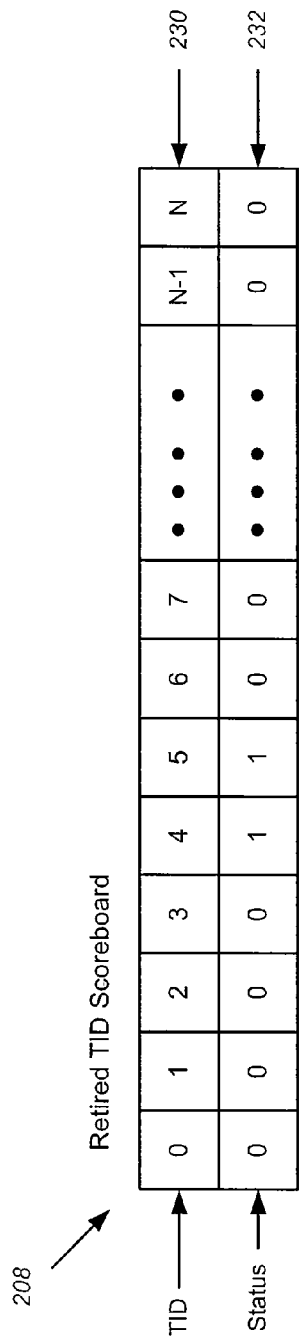
FIG. 2B illustrates a chart of possible firmware commands and one possible breakdown of the commands into DMA requests and associated TIDs per request according to embodiments of the invention.
FIG. 2C illustrates a representative retired TID scoreboard according to embodiments of the invention.

FIG. 2B illustrates a chart of exemplary firmware commands and an exemplary breakdown of the commands into DMA requests and associated TIDs per request according to embodiments of the invention. Referring to FIGS. 2A and 2B, one or more processors 202 may issue commands or requests 220 in FIG. 2B to transfer data from a host device 204, including a host address and a byte count. The size 222 of each request in the example of FIG. 2B may include a byte count of 1024, 2048, and 1024, respectively. However, according to the parameters of the host device, the host device can only accept a request of a certain maximum size. For example, a host utilizing PCIe may be limited to a maximum request size of 512 bytes. Therefore, in the example of FIG. 2B, each instruction is broken up by the DMA engine 206 into multiple requests of 512 bytes. As shown at 224 in the example of FIG. 2B, the first instruction is broken into two 512 byte requests, the second into four requests, and the third into two requests, each request representing a read as shown at 226. The DMA engine 206 then assigns a TID from the TID FIFO 210 to each request as shown at 228. TIDs 0 and 1 are assigned to each request in the first instruction, TIDs 2, 3, 4, and 5 are assigned to each request in the second instruction, and TIDs 6 and 7 are assigned to each request in the third instruction. Each TID is assigned to track the DMA requests.

The requests are then sent to the host 204. Once the request is completed, the host 204 sends a response back to the DMA engine 206. The DMA 206 then recycles the TID back into the TID FIFO 210. If a TID is not returned, the associated request is not completed, and the TID is retired into a retired TID scoreboard. A request may not be completed for any number of reasons. The retired TIDs are not used again, as they may still be associated with an out of date request, until they are restored.

One example of a host bus architecture is Peripheral Component Interconnect (PCI), which is a hardware standard for connecting peripheral devices in a computing system. PCI contemplates the use of buffers to decouple the CPU from relatively slow peripherals and allows them to operate asynchronously. Generally, a PCI architecture does not include a central DMA controller. However, any PCI component can request control of the bus directly, and read or write directly to subsystem hardware. PCI express (PCIe) is a high-speed peripheral interconnect with serial communication channels.

FIG. 2C illustrates a representative retired TID scoreboard 208 according to embodiments of the invention. The scoreboard 208 may be a register representing a bit map. The scoreboard 208 keeps track of all possible TIDs 230, and the status of the TID 232. The status bit 232 indicates whether each TID is active, represented by a 0 in this example, or retired, represented as a 1 in this example. Referring to the example of FIG. 2B, if all the requests are returned and completed, the scoreboard would assign a status bit of "0" to each returned TID. However, for instance, if requests associated with TID 4 and 5 timed out, TID 4 and 5 would be retired. The DMA 206 would set the status bit of those TIDs to "1" in scoreboard 208, indicating that those TIDs have been retired.

Referring again to FIG. 2A, firmware, residing in memory 240 and executed by processor 242 within DMA engine 206, may restore individual TIDs from the retired scoreboard 208 by clearing the associated bit. Firmware may be used to monitor the TID scoreboard 208 to determine when a TID should be restored. Therefore, according to one embodiment of the invention, individual TIDs may be restored without resetting the entire DMA engine 206. The restoration of individual TIDs may also occur without having to wait for other DMA traffic to complete. Processors 202 may coordinate the TID restore to ensure that a particular TID is not in use when it is cleared.

In one embodiment, the DMA engine 206 may periodically monitor the retired TID scoreboard 208 to determine when a "clear" should occur. For instance, the DMA engine 206 can poll the scoreboard 208 periodically, at a rate set by the longest time out period of an attached host device. For example, if a system contains three host devices interacting with the DMA engine 206, the longest time-out period of the three hosts may be used to determine the poll rate of the scoreboard by the DMA engine. Alternatively, the poll rate may be programmed into a register and changed by software or a user. The poll rate may also depend on the number of remaining available TIDs. For instance, when all TIDs are available, and no TIDs have yet been retired, the DMA engine may poll the scoreboard after a set amount of time. After this poll, if the scoreboard indicates that only a few TIDs were retired, the DMA engine may decrease the poll rate. However, if the number of retired TIDs is found to be large, the DMA engine may increase the poll rate. Any one of these methods, or a combination of methods, may be used to determine a polling rate of the scoreboard by the DMA engine.

After polling the TID scoreboard 208, the DMA engine 206 may determine that some or all of the TIDs should be restored. Once the DMA engine determines that a restore is needed, the DMA engine 206 may send an interrupt signal to a process running in the DMA engine to determine which retired TID should be restored. The DMA engine 206 may determine that a restore should occur based on a variety of factors. For instance, the DMA may track the remaining available TIDs, and if the remaining available TIDs falls below a determined threshold, the DMA engine may send an interrupt signal to the process running in the DMA processor 242. Alternatively, the DMA engine may compare the remaining available TIDs to the number of retired TIDs, and send an interrupt if the percentage of available TIDs falls below a certain threshold. The DMA engine may also keep track of previous copies of the TID scoreboard to determine the rate at which TIDs are retired. For instance, if a host device is non-responsive, then all DMA requests associated with that host will time out and the associated TIDs will be retired. The single unresponsive host may retire multiple TIDs in a short period of time. Therefore, the DMA engine may compare previous copies of the scoreboard to the present scoreboard to determine how many new TIDs were retired since the last poll. If the number of newly retired TIDs is above a certain threshold, then the DMA may send an interrupt signal. The DMA may use any one of these methods, or a combination thereof, or other factors to determine whether an interrupt should be generated.

Note that one or more of the functions described in this specification can be performed by firmware stored in memory 240 and executed by DMA processor 242, or stored in program storage and executed by one or processors 202 (see, e.g., processor 212 and program storage 244 in the example of FIG. 2A). The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 3:
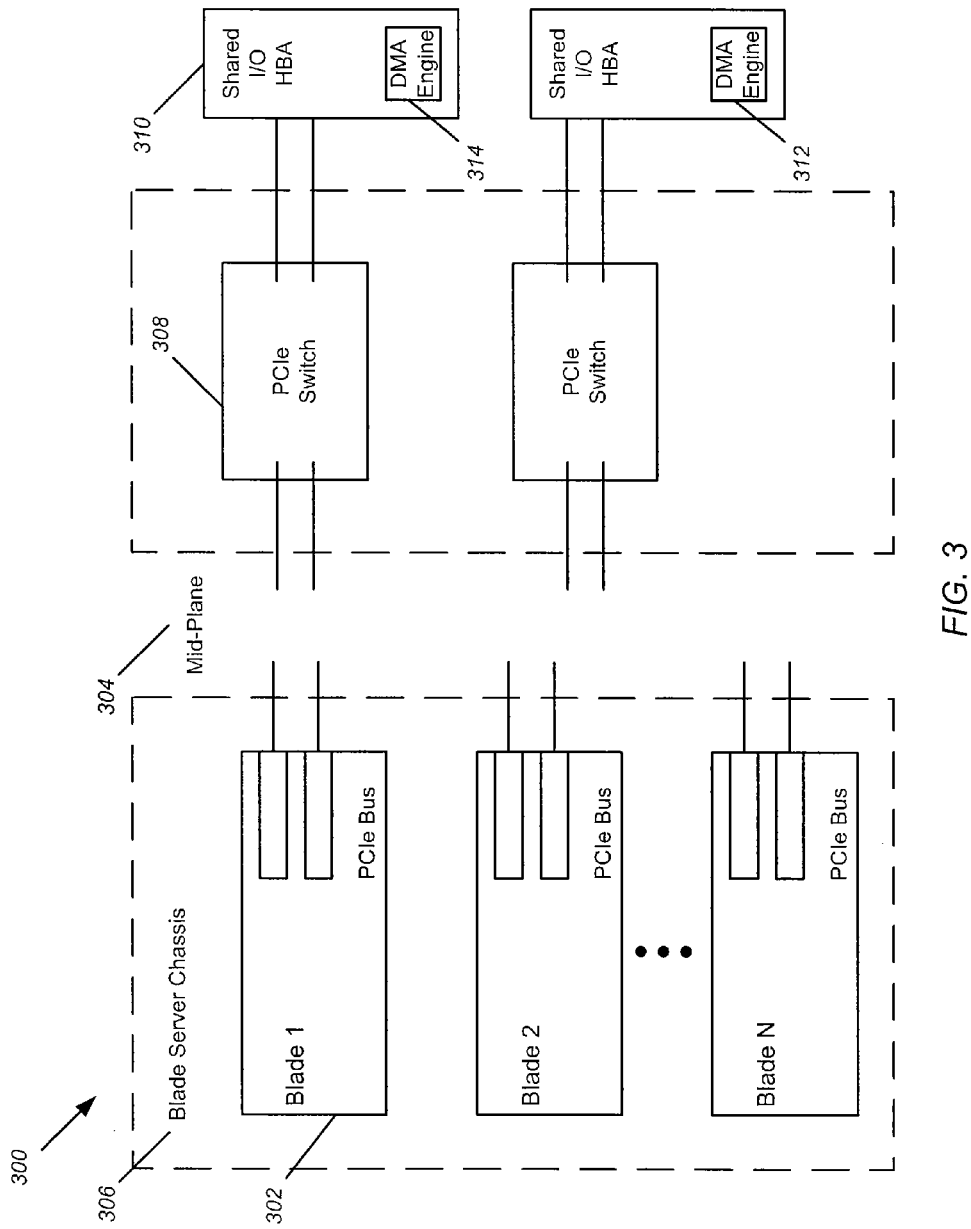
FIG. 3 illustrates an exemplary blade server capable of utilizing a TID scoreboard to restore TIDs according to embodiments of the invention.

FIG. 3 illustrates exemplary blade server 300 including one or more embodiments of the invention described above. Blade server 300 utilize a modular, plug-in approach wherein the housing for each server is eliminated along with self-contained components, such as power supplies and fans. The server blades 302 are plugged directly into a mid-plane 304 within the blade server chassis 306. The mid-plane 304 contains lanes or paths on a printed circuit board and connectors for receiving the server blades 302 routed to switches 308. To enable the server blades 302 to communicate over a network, a Host Bus Adapter (HBA) (Input/Output (I/O) controller) 310 can be shared between multiple blades 302. The blade server 300 may also contain a redundant HBA 312. The blade server mid-plane 304 may be plumbed to allow for multiple independent protocols, such as Fibre Channel, Ethernet or InfiniBand. PCIe switches 308 may be deployed between the blade server 302 and the shared HBA 310. The HBA 310 may include a DMA engine 314 according to embodiments of the invention. The HBA 310 may additionally include the TID FIFO and the retired TID scoreboard as described above.

According to one embodiment of the invention, one HBA 310 may act as a master controller which keeps track of all TIDs and the TID scoreboard. A second HBA 312 may back up the primary HBA 310 and act as a redundant system in case of failure of the primary HBA 310. Alternatively, the TIDs may be divided into pools between the various HBAs. In such an embodiment, each HBA 310 or 312 can monitor its own TID pool and associated retired TID scoreboard.

When a TID is retired, the DMA engine 312 may send an interrupt signal to the associated HBA. If the master architecture is used, the DMA may send the signal to the primary HBA 310 or to both HBA 310 and 312. If the TIDs are divided between HBAs 310 and 312, then an interrupt may be sent only to the associated HBA with the retired TID.

When an HBA 310, either the master or the controller in charge of a set of TIDs, receives an interrupt signal from the DMA engine 314, the HBA may determine whether or not to restore a particular TID or set of TIDs. The HBA may use various parameters to determine whether a particular set of individual TIDs should be restored. For instance, the HBA may consider the entire set of retired TIDs and determine that enough TIDs remain that a restore is not required; or the HBA may restore the TIDs retired for the longest amount of time. Firmware may be used to track the retired elapsed times of individual TIDs. The HBA may restore any individual TIDs that have been retired for a certain amount of time or longer. This amount of time may be based on the time out period for individual hosts, or the longest time out period for the set of attached hosts. The HBA may use any one or any combination of factors to determine whether an individual or a set of TIDs should be restored. The HBA may employ different factors determined by how many TIDs remain available. For instance, if only a few TIDs are currently retired when the HBA receives an interrupt, the HBA may choose a scheme that does not restore any TIDs, or only individual TIDs. But if many TIDs have already been retired, the HBA may restore a set of TIDs based on a different parameter. Firmware may alternatively be used to track which host device caused each TID to retire. The HBA may use this information to restore TIDs that are associated with a host that appears to retire a disproportionate number of TIDs, potentially indicating a failed host.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A system for managing retired transaction identifiers (TIDs), the system comprising:
    a memory operable to maintain an individual status of each TID of a plurality of TIDs, the plurality of TIDs comprising one or more retired TIDs, wherein a TID is retired if an associated command does not complete; and
    a processor operable to selectively restore a first retired TID of the one or more retired TIDs, wherein the first retired TID is selectively restored without requiring the processor to be reset.

2. The system of claim 1, wherein the first retired TID is selectively restored without disturbing active DMA operations.

3. The system of claim 1, wherein the first retired TID is selectively restored without impacting new DMA commands.

4. The system of claim 1, wherein the first retired TID is selectively restored without impacting future commands that are in a queue for operation.

5. The system of claim 1, wherein the first retired TID is selectively restored without depending on a status of an active DMA operation.

6. The system of claim 1, wherein the processor is operable to periodically poll the memory to determine when the first retired TID should be restored.

7. The system of claim 1, wherein the first retired TID is selectively restored based on a number of remaining available TIDs in the one or more retired TIDs.

8. The system of claim 1, wherein the first retired TID is selectively restored based on a ratio of the number of retired TIDs to the number of available TIDs.

9. The system of claim 1, wherein the first retired TID is selectively restored based on a predetermined rate.

10. The system of claim 1, wherein the processor is incorporated within a host bus adapter (HBA).

11. A method for managing transaction identifiers (TIDs), the method comprising:
    maintaining an individual status of each TID of a plurality of TIDs, the plurality of TIDs comprising one or more retired TIDs, wherein a TID is retired if an associated command does not complete; and
    selectively restoring a first retired TID of the one or more retired TIDs, wherein the first retired TID is selectively restored without requiring the processor to be reset.

12. The method of claim 11, wherein the first retired TID is selectively restored without disturbing active DMA operations.

13. The method of claim 11, wherein the first retired TID is selectively restored without impacting new DMA commands.

14. The method of claim 11, wherein the first retired TID is selectively restored without impacting future commands that are in a queue for operation.

15. The method of claim 11, wherein the first retired TID is selectively restored without depending on a status of an active DMA operation.

16. The method of claim 11, wherein the method comprises periodically polling to determine when the first retired TID should be restored.

17. The method of claim 11, wherein the first retired TID is selectively restored based on a number of remaining available TIDs in the one or more retired TIDs.

18. The method of claim 11, wherein the first retired TID is selectively restored based on a ratio of the number of retired TIDs to the number of available TIDs.

19. The method of claim 11, wherein the first retired TID is selectively restored based on a predetermined rate.

20. The method of claim 11, wherein the processor is incorporated within a host bus adapter (HBA).

* * * * *